United States Patent [19]

Hegedus et al.

[11] Patent Number: 4,885,324

[45] Date of Patent: Dec. 5, 1989

[54] COMBINATION PRIMER/TOPCOAT COATING

[75] Inventors: Charles R. Hegedus, Warrington, Pa.; William J. Green, Clementon, N.J.

[73] Assignee: The United States of America as represented by the Secretary of the Navy, Washington, D.C.

[21] Appl. No.: 331,200

[22] Filed: Mar. 28, 1989

Related U.S. Application Data

[63] Continuation of Ser. No. 211,026, Jun. 16, 1988, abandoned.

[51] Int. Cl.$^4$ .................................................. C08L 75/04
[52] U.S. Cl. .................................... 524/204; 524/396; 524/406; 524/414; 524/706; 524/724; 524/783
[58] Field of Search ............... 524/204, 396, 406, 414, 524/706, 724, 783

[56] References Cited

U.S. PATENT DOCUMENTS

| | | | |
|---|---|---|---|
| 3,341,498 | 9/1967 | Skreckoski et al. | 524/204 |
| 3,523,100 | 8/1970 | Stein et al. | 524/204 |
| 3,554,951 | 1/1971 | Blomeyer et al. | 524/783 |
| 4,075,152 | 2/1978 | Taller | 524/706 |
| 4,247,675 | 1/1981 | Fukuda et al. | 524/706 |
| 4,281,078 | 7/1981 | Strolle et al. | 524/406 |

*Primary Examiner*—Maurice J. Welsh
*Attorney, Agent, or Firm*—John M. O'Meara; Susan E. Verona

[57] ABSTRACT

A coating for metallic or polymeric composite substrates is disclosed which performs both as a primer and as a topcoat. It comprises a two component aliphatic polyurethane binder, with titanium dioxide, zinc molybdate, zinc phosphate, an organo-zinc salt, and titanium dioxide vesiculated bead pigments in controlled amounts. The coating exhibits good adhesion, corrosion inhibition, flexibility, chemical and weather resistance, and opacity.

26 Claims, No Drawings

COMBINATION PRIMER/TOPCOAT COATING

STATEMENT OF GOVERNMENT INTEREST

The invention described herein may be manufactured and used by or for the Government of the United States of America for governmental purposes without the payment of any royalties thereon or therefor.

This is a continuation of application Ser. No. 211,026 filed on June 16, 1988, now abandoned.

The present invention relates generally to a coating for metallic or polymeric composite substrates and more particularly to such a coating which can perform as both a primer and a topcoat.

BACKGROUND OF THE INVENTION

Many metal and polymeric composite surfaces require the protection of a coating. For example, Navy aircraft surfaces need protection from the harsh aircraft-carrier environment, which contains corrosive sea water spray and, on non-nuclear carriers, sulfur dioxide stack gases. Therefore, these aircraft need a coating which will be corrosion inhibitive as well as chemically resistant, weather resistant, flexible, even at low temperatures, and have good surface adhesion.

Currently, Navy aircraft are painted with a high performance multi-component protective paint system consisting of an epoxy primer and a polyurethane topcoat. Several types of aircraft also require a coat of spray sealant between the primer and the topcoat. More than one component has been used because no single component provides all the desirable properties.

The epoxy primer of the current system is applied to a dry film thickness ranging from 0.006 to 0.0009 inches and is designed to adhere to the substrate, promote adhesion of the topcoat, and prevent corrosion. However, the primer must be topcoated because it lacks flexibility, especially at low temperatures ($-60°$ F.), resulting in extensive cracking of the paint system in highly flexed areas of the aircraft. The primer also lacks weather resistance and cannot be formulated in the appropriate colors for an aircraft topcoat. In addition, it includes strontium chromate as a corrosion inhibitor, a known carcinogen.

The polyurethane topcoat currently used is normally applied over the primer to a dry film thickness of 0.0020 to 0.0022 inches. It provides chemical and weather resistance, flexibility, and the desired optical properties. The topcoat requires the use of a primer, however, because it will not inhibit corrosion and does not have adequate adhesion to the metal substrate.

A 0.0120 inch thick sealant coat is occasionally applied between the primer and topcoat to enhance the flexibility of the coating system. The sealant is soft and easily deformed and is difficult to apply and remove.

The current multi-component coating system described above has several deficiencies. It has a total dry film thickness ranging from 0.0026 to 0.0151 inches, adding considerable weight to an aircraft, for instance. In addition, it is time consuming to apply and remove. The system also generates a high level of volatile organic component (VOC) emissions during the painting operation.

SUMMARY OF THE INVENTION

Accordingly, it is a general object of the invention to provide a single coating which can be applied directly to a metal or polymeric composite substrate and also perform as a topcoat.

It is another object to furnish a coating which will provide corrosion protection to a metallic or polymeric composite substrate while being adherent, flexible, chemically resistant, weather resistant, and opaque.

Yet another object is to reduce the risk of coating failure due to cracking and allow easy coating touch-up when required.

Still another object is to reduce the amount of time and manpower required to apply and remove a paint system.

Another object is to reduce the weight added to an object by a paint system.

It is also an object to decrease the level of VOC emissions during a painting operation and to eliminate the use of strontium chromate in a paint system.

Briefly, these and other objects of the present invention are accomplished by a coating comprising a polyurethane binder formed by the reaction of an aliphatic polyester polyol with hexamethylene diisocyanate. Pigments are provided for opacity and strength, consisting essentially of titanium dioxide spherical particles and vesiculated beads. The coating also contains pigments for providing corrosion prevention, consisting essentially of zinc phosphate, zinc salt of a substituted benzoic acid, and zinc molybdate.

Other objects, advantages, and novel features of the present invention will become apparent from the following detailed description thereof.

DESCRIPTION OF THE PREFERRED EMBODIMENT

The present invention is a coating for application to metallic or polymeric composite surfaces which performs as both a primer and a topcoat, being adherent, flexible, chemically resistant, weather resistant, corrosion inhibiting, and opqaue. It is particularly useful on Navy aircraft, which are exposed to a corrosive sea water environment, and require a light weight coating.

The coating contains a polyurethane binder obtained by reacting a blend of polyester polyols with hexamethylene diisocyanate (HMDI) in stoichiometric proportion. In a preferred embodiment, the polyester polyol is provided in the form of a 36.5% (by wt.) solution of aliphatic polyester polyol in toluene and ethyl glycol acetate. The solution has an equivalent weight of $790\pm150$, a density of 1.06, a hydroxyl number of $71\pm10$, a maximum acid number of ;b 10, and a solids content of $36.5\%\pm5\%$. One such polyester polyol blend is X3009-Part A manufactured by Coatings for Industry. Preferrably, the HMDI is provided in a 75% (by wt.) concentration in ethyl glycol acetate. This solution has an isocyanate content of $16.5\%\pm2.5\%$, a density of 1.07, and an equivalent weight of $255\pm15$. A suitable HMDI solution is X3009-Part B, also manufactured by Coatings for Industry. The polyurethane polymer formed by the reaction of the two parts forms the continuous matrix of the coating while also providing weather resistance, chemical resistance, adhesion, and flexibility.

Pigments for providing re-enforcing strength and opacity are also included in the coating. One such pigment is rutile titanium dioxide in the form of spherical particles having an average particle size of $0.25\pm0.1$ microns. This pigment provides color to the coating as well. Another such pigment is titanium dioxide vesiculated beads. The beads have an average particle size of $6.0 \pm 2.0$ microns. Their composition by weight is at least 35% titanium dioxide with the balance being polyester polymer. They also include voids, which constitute $22.3\% \pm 7\%$ of their volume. The beads provide opacity and strength without significantly increasing the viscosity of the wet coating. They also assist in reducing glass due to their high oil absorption characteristics.

Three pigments are included in the coating in controlled portions for corrosion prevention. One is a zinc phosphate pigment with an average particle size of $5.0 \pm 2.0$ microns. Another is a zinc salt of a substituted benzoic acid having one or more hydroxyl groups and a nitro ($NO_2$) side group. This pigment is characterized by a molecular weight of $300 \pm 200$, a density of 2 to 3 grams per milliliter, and a particle specific surface of $16 \pm 5$. It also has an ASTM D281 oil absorption of $40 \pm 10$, which is good if a low gloss coating is desired. One suitable such zinc salt is a commercial product of BASF called Sicorin RZ. The third corrosion preventive ingredient is zinc molybdate, which also provides opacity and strength. The zinc molybdate particles should have an average size of $4.0 \pm 2.0$ microns.

Table I sets forth the above pigments and summarizes various properties connected therewith.

TABLE I

|  | Titanium Dioxide | Zinc Molybdate | Zinc Phosphate | Zinc Salt | Titanium Dioxide Beads |
|---|---|---|---|---|---|
| Appearance | White | White | White | White | White |
| Shape | Spherical | Spherical | Rectangular | Platelet | Spherical |
| Density (g/ml) | 4.0 | 5.0 | 3.6 | 2.5 | 0.6 |
| Oil Absorption (ASTM D281) | 29.3 | 16.0 | 23.2 | 40.0 | 146.8 |
| Particle Size, Average, in microns | 0.25 | 4.0 | 5.0 | 2.5 | 6.0 |

Four effective formulations of the basic formula of the coating are set forth in Table II on a weight percent basis. Formulation A is the preferred one.

TABLE II

|  | A | B | C | D |
|---|---|---|---|---|
| Polyester polyol blend | 37.8 | 42.0 | 34.0 | 38.0 |
| Titanium dioxide/particles | 1.1 | 0.5 | 2.0 | 1.0 |
| Titanium dioxide/vesiculated beads | 0.4 | 0.5 | 0.9 | 0.3 |
| Zinc phosphate | 17.1 | 18.0 | 16.5 | 20.0 |
| Zinc salt | 1.7 | 3.9 | 1.0 | 2.0 |
| Zinc molybdate | 30.1 | 22.0 | 35.0 | 27.1 |
| HMDI solution | 11.8 | 13.1 | 10.6 | 11.6 |

Other ingredients may be added to provide various desirable features. For instance, to increase the coating's pot life, 2,4 pentanedione may be added in an amount by weight of up to 5% of the weight of the basic formula.

Also optional is the addition of an anti-settling agent for improved pigment wetting and dispersion, and increased shelf life. Any anti-settling solution may be used and should be added in an amount by weight ranging from 0.3 to 2.0% of the weight of the basic formula. A preferred such anti-settling agent is a solution of high molecular weight carboxylic acid salts of polyamine amides known as Anti-Terra-204, manufactured by BYK-Chemie USA.

The coating may also contain a solvent system such as toluene or 1,1,1 trichloroethane. This is for adjusting the viscosity of the coating and should be added in an amount suitable for the desired viscosity. Any solvent compatible with the resin system will suffice, but should have a solubility parameter of $8.9 \pm 0.9$. Tinting pigments may also be added in appropriate amounts to obtain the desired coloring.

The coating is prepared by mixing all of the ingredients except the HMDI solution, and milling the resulting mixture to a fineness of grind of $\geqq 5$ on the ASTM-D-1210 scale. The HMDI solution is then added, and the coating is applied while still liquified to a thickness ranging from 0.0018 to 0.0022 inches. The coating may be applied by brushing, rolling, or spraying it on the surface. If the coating is sprayed on the surface, a solvent system should be added to obtain the desired viscosity, in an amount by volume of about 15% of the volume of the basic formula.

In tests, the coating of the present invention provided corrosion protection for an aluminum substrate for over 2000 hours in 5% salt spray. The coating also performed well when exposed to heat, high intensity light and water, extreme cold, hot lubricating oil and other aircraft operational chemicals, and impact testing.

Some of the many advantages of the invention should now be readily apparent. For instance, a coating for a metallic or polymeric composite substrate has been provided which performs as both a primer and a topcoat. It has the combined properties of both, being adherent, flexible, chemical and weather resistant, corrosion inhibitive, and opaque, and is therefore particularly useful in a corrosive seawater environment. A coating has been provided which reduces the risk of failure due to cracking, especially at low temperatures, and is easily touched up, since only one coating need be applied. Additionally, since the coating provided by the present invention requires only one coat and no sealant, it requires less application and removal time and manpower (up to 50% less) than currently used coating systems. The coating provided also adds less film thickness and weight to the coated object (up to 30% less) than existing paint systems, an important factor for use on aircraft. The coating provided by the present invention also reduces VOC emissions during the painting operation and does not contain the carcinogen strontium chromate.

Obviously, many modifications and variations of the present invention will be readily apparent to those of ordinary skill in the art in light of the above teachings. It is therefore to be understood that, within the scope of the appended claims, the invention may be practiced otherwise than as specifically described.

What is claimed is:

1. A coating for metallic or polymeric composite surfaces which performs as both a primer and a topcoat, comprising:

a polyurethane binder formed by the reaction between an aliphatic polyester polyol and hexamethylene diisocyanate;

pigments for providing opacity and strength consisting essentially of titanium dioxide spherical particles and titanium dioxide vesiculated beads; and pigments for providing corrosion prevention consisting essentially of zinc phosphate, zinc salt of a substituted benzoic acid, and zinc molybdate.

2. The coating of claim 1 wherein the aliphatic polyester polyol forms 36.5% by weight of a solution in toluene and ethyl glycol acetate.

3. The coating of claim 2 wherein the 36.5% aliphatic polyester polyol solution has an equivalent weight ranging from 640 to 940, a hydroxyl number ranging from 61 to 81, and a maximum acid number of 10.

4. The coating of claim 3 wherein the hexamethylene diisocyanate forms 75% by weight of a solution in ethyl glycol acetate, which solution has an isocyanate content ranging from 14 percent to 19 percent and an average equivalent weight ranging from 240 to 270.

5. The coating of claim 4 wherein the zinc salt has a hydroxyl group and a nitro side group.

6. The coating of claim 5 wherein the zinc salt has a molecular weight ranging from 100 to 500 and a density ranging from 2 to 3 grams per milliliter.

7. The coating of claim 6 wherein the zinc salt has an oil absorption ranging from 30 to 50.

8. The coating of claim 7, wherein:
said aliphatic polyester polyol solution constitutes about 34.0 to 42.0 weight percent of the coating;
said hexamethylene diisocyanate solution constitutes about 10.0 to 13.5 weight percent of the coating;
said titanium dioxide spherical particles constitute about 0.5 to 2.0 weight percent of the coating;
said titanium dioxide vesiculated beads constitute about 0.3 to 1.0 weight percent of the coating;
said zinc phosphate constitutes about 16.5 to 20.0 weight percent of the coating;
said zinc molybdate constitutes about 22.0 to 30.5 weight percent of the coating; and
said zinc salt constitutes about 1.0 to 4.0 weight percent of the coating.

9. The coating of claim 1 wherein the titanium dioxide spherical particles have an average size ranging from 0.15 microns to 0.35 microns.

10. The coating of claim 1 wherein the titanium dioxide vesiculated beads have an average size ranging from 4 microns to 8 microns and comprise at least 35 percent by weight titanium dioxide, the balance being polyester polymer, and having voids constituting from 15.3 percent to 29.3 percent by volume of the beads.

11. The coating of claim 1 wherein the zinc phosphate has an average particle size ranging from 3 microns to 7 microns.

12. The coating of claim 1 further comprising a solvent system.

13. The coating of claim 12 wherein said solvent system is toluene.

14. The coating of claim 1 further comprising an anti-settling agent.

15. The coating of claim 14 wherein said anti-settling agent is a solution of high molecular weight carboxylic acid salts of polyamine amides.

16. The coating of claim 1 further comprising pentanedione for increased pot life.

17. The coating of claim 1 further comprising tinting pigments.

18. A coating for metallic or polymeric composite surfaces which performs as both a primer and a topcoat, formed by mixing and grinding a combination of ingredients, said combination comprising:

about 34.0 to 42.0 weight percent of a 36.5 weight percent aliphatic polyester polyol solution in toluene and ethyl glycol acetate having an equivalent weight ranging from 640 to 940 and a hydroxyl number ranging from 61 to 81;

about 10.0 to 13.5 weight percent of a 75 weight percent hexamethylene diisocyanate solution in ehtyl glycol acetate having an equivalent weight ranging from 240 to 270 and an isocyanate content rangnging from 14 weight percent to 19 weight percent;

about 1.0 to 4.0 weight percent of a zinc salt of a substituted benzoic acid having a hydroxyl group and a nitro side group and a molecular weight ranging from 100 to 500;

about 0.5 to 2.0 weight percent titanium dioxide spherical particles;

about 0.3 to 1.0 weight percent titanium dioxide vesiculated beads having at least 35 weight percent titanium dioxide and at least 15 volume percent voids;

about 16.5 to 20.0 weight percent zinc phosphate particles; and about 22.0 to 30.5 weight percent zinc molybdate particles.

19. A pigmment system for a coating for metallic or polymeric composite surfaces which enables the coating to perform as both a primer and a topcoat, comprising:

pigments for providing opacity and strength consisting essentially of titanium dioxide spherical particles and titanium dioxide vesiculated beads; and pigments for providing corrosion prevention consisting essentially of zinc phosphate, zinc salt of a substituted benzoic acid, and zinc molybdate.

20. The pigment system of claim 19, wherein:
said titanium dioxide spherical particles constitute about 0.5 to 2.0 weight percent of the coating;
said titanium dioxide vesiculated beads constitute about 0.3 to 1.0 weight percent of the coating;
said zinc phosphate constitutes about 16.5 to 20.0 weight percent of the coating;
said zinc molybdate constitutes about 22.0 to 30.5 weight percent of the coating; and
said zinc salt constitutes about 1.0 to 4.0 weight percent of the coating.

21. The pigment system of claim 19 wherein the zinc salt has a hydroxyl group and nitro side group.

22. The pigment system of claim 21 wherein the zinc salt has a molecular weight ranging from 100 to 500 and a density ranging from 2 to 3 grams per milliliter.

23. The pigment system of claim 22 wherein the zinc salt has an oil absorption ranging from 30 to 50.

24. The pigment system of claim 19 wherein the titanium dioxide spherical particles have an average size ranging from 0.15 microns to 0.35 microns.

25. The pigment system of claim 19 wherein the titanium dioxide vesiculated beads have an average size ranging from 4 microns to 8 microns and comprise at least 35 percent by weight titanium dioxide, the balance being polyester polymer, and having voids constituting from 15.3 percent to 29.3 percent by volume of the beads.

26. The pigment system of claim 19 wherein the zinc phosphate has an average particle size ranging from 3 microns to 7 microns.

* * * * *